United States Patent [19]
Hailpern et al.

[11] Patent Number: 6,065,058
[45] Date of Patent: May 16, 2000

[54] DYNAMIC PUSH FILTERING BASED ON INFORMATION EXCHANGED AMONG NODES IN A PROXY HIERARCHY

[75] Inventors: Brent Tzion Hailpern, Katonah; Peter Kenneth Malkin, Ardsley; Robert Jeffrey Schloss, Briarcliff Manor; Philip Shi-Lung Yu, Chappaqua, all of N.Y.

[73] Assignee: International Business Machines Corp., Armonk, N.Y.

[21] Appl. No.: 08/854,226

[22] Filed: May 9, 1997

[51] Int. Cl.$^7$ .................................................. H04L 12/18
[52] U.S. Cl. ........................... 709/231; 709/204; 370/270
[58] Field of Search ............................... 395/673, 200.33, 395/200.78, 200.32, 200.68; 709/4, 203, 248, 202, 238, 231, 204, 206, 230; 711/122; 707/10, 104; 370/260, 270

[56] References Cited

U.S. PATENT DOCUMENTS

| | | | |
|---|---|---|---|
| 5,687,367 | 11/1997 | Dockter et al. | 395/613 |
| 5,706,507 | 1/1998 | Schloss | 395/615 |
| 5,740,549 | 4/1998 | Reilly et al. | 705/14 |
| 5,761,683 | 6/1998 | Logan | 707/513 |
| 5,812,844 | 9/1998 | Jones | 395/674 |
| 5,862,325 | 1/1999 | Reed et al. | 709/201 |

OTHER PUBLICATIONS

Resnick, Paul, PICS: Internet Access Controls without Censorship, Communications of the ACM, 1996, vol. 39(10), pp. 87–93.

McFadden, Mark, Cache only please: Web caching is here, Digital Age, v15 p32(1), Apr. 1996.

Bowden, Eric, Tools improve net access: LAN Times, Jul. 8, 1996 v13 n15 p77(2).

Bowman, et al, Harvest: A Scalable, Customizable Discovery and Access System, Aug. 1994.

*Primary Examiner*—Dung C. Dinh
*Attorney, Agent, or Firm*—Kevin M. Jordan; David M. Shofi; Anne Vachon Dougherty

[57] ABSTRACT

A push-based filtering of objects in a client-server hierarchy based on usage information. A method of annotating a push object with meta information on its content and/or urgency is also described. Objects can be staged at the server(s) to provide fast access when the filtered object is later requested. The PICS protocol may be used to communicate various types of information: e.g., by the content provider or a higher level proxy to annotate the object, including an urgency, a summary or title, a group classification, and/or an identity of the push; to convey usage or preference information on pushed objects up the hierarchy, including usage information and user preferences based on object group classifications; and to convey a staging status of each staged object down the hierarchy to improve caching efficiency. An object may include a content hierarchy such as a title, a summary and the full content. The filtering process can factor in not only which next (lower) level nodes will receive the push, but also the content level each node will receive. The push filtering decision can be based on aggregate usage information at the lower level proxy or client nodes. A staging decision can be based on the filtering decision, the successful completion of the push to the selected lower level proxies/clients, object usage information and/or a staging decision on other nodes in the hierarchy. An efficient means to purge a staged object is also described.

30 Claims, 11 Drawing Sheets

DYNAMIC PUSH FILTERING BASED ON INFORMATION EXCHANGED AMONG NODES IN A PROXY HIERARCHY

CROSS-REFERENCE TO RELATED APPLICATIONS

The present invention is related to U.S. patent applications: Ser. No. 08/831,237, filed Apr. 2, 1997, entitled "Collaborative Caching," by C. Aggarwal et al., now U.S. Pat. No. 5,926,116; and Ser. No. 08/741,412, filed Oct. 29, 1996, entitled "System and Method for Caching Objects of Non-Uniform Size," by Aggarwal et al., now U.S. Pat. No. 6,012,126. These applications and the present invention are commonly assigned to the International Business Machines Corporation of Armonk, N.Y. The descriptions set forth in these applications are hereby incorporated by reference in their entirety into the present application.

FIELD OF THE INVENTION

The present invention is related to an improved data processing system. A particular aspect of the present invention is related to a dynamic push (or broadcast) filtering method for delivering objects or documents in a hierarchy of proxy servers. A more particular aspect of the present invention is related to pushing Web objects on the World Wide Web.

GLOSSARY OF TERMS

While dictionary meanings are also implied by certain terms used here, the following glossary of some terms may be useful.

Internet

The network of networks and gateways that use the TCP/IP suite of protocols.

Client

A client is a computer which issues commands to the server which performs the task associated with the command.

Server

Any computer that performs a task at the command of another computer is a server. A Web server typically supports one or more clients.

World Wide Web (WWW or Web)

The Internet's application that lets people seeking information on the Internet switch from server to server and database to database by clicking on highlighted words or phrases of interest (hyperlinks). An Internet WWW server supports clients and provides information. The Web can be considered as the Internet with all of the resources addressed as URLs and which uses HTML to display the information corresponding to URLs and provide a point-and-click interface to other URLs.

Universal Resource Locator (URL)

A way to uniquely identify or address information on the Internet. Can be considered to be a Web document version of an e-mail address or a fully-qualified network file name. They can be accessed with a Hyperlink. An example of a URL is "http://www.philipyu.com:80/table.html". Here, the URL has four components. Starting from the left, the first specifies the protocol to use, separated from the rest of the locator by a ":". Next is the hostname or IP address of the target host; this is delimited by the "//" on the left and on the right by a "/" or optionally a ":". The port number is optional, and is delimited on the left from the hostname by a ":" and on the right by a "/". The fourth component is the actual file name or program name. In this example, the ".html" extension means that this is an HTML file.

HyperText Markup Language (HTML)

HTML is a language which can be used, among other things, by Web servers to create and connect (via hyperlinks) documents to other Web documents, which can be viewed by web clients.

Hypertext transfer protocol (HTTP or http)

HTTP is an example of a stateless protocol, which means that every request from a client to a server is treated independently. The server has no record of previous connections. At the beginning of a URL, "http:" indicates that the requesting client and target server will communicate using the Hypertext Transfer Protocol regarding the specified resource.

Internet Browser or Web browser

A graphical interface tool that runs Internet protocols such as http, and display results on the user's screen. The browser can act as an Internet tour guide, complete with pictorial desktops, directories and search tools used when a user "surfs" the Internet. In this application the Web browser is a client service which communicates with the World Wide Web.

Client cache

Client caches are typically used as primary caches for objects accessed by the client. In a WWW environment, client caches are typically implemented by web browsers and may cache objects accessed during a current invocation, i.e., a nonpersistent cache, or may cache objects across invocations.

Caching proxies

Specialized servers in a network which act as agents on the behalf of the client to locate a cached copy of an object Caching proxies typically serve as secondary or higher level caches, because they are invoked as a result of cache-misses from client caches.

HTTP Daemon (HTTPD)

A server having Hypertext Transfer Protocol and Common Gateway Interface capability. The HTTPD is typically supported by an access agent which provides the hardware connections to machines on the intranet and access to the Internet, such as TCP/IP couplings.

BACKGROUND

The rapid increase in popularity of the World Wide Web (WWW or web) has led to a corresponding increase in the amount of traffic over the Internet. As a result, the web has become a primary bottleneck on network performance. When documents or information are requested by a user who is connected to a server via a slow network link, there can be noticeable latency at the user end. To avoid the long wait for "pulling" the requested documents, an alternative is to have the content provider "push" the documents to the users based on pre-specified user preferences or profiles as soon as relevant documents become available.

The push alternative has the tendency of overflowing the network. This is often due to the fact that users tend to inadequately specify their preferences so that too many documents get pushed to the users.

Under the conventional "pull" approach, one way to reduce access latencies is to cache copies of popular documents or information closer to the user, from which the access latencies are more acceptable. The caching can be implemented at various points on the network. For example, a large university or corporation may have its own local cache, from which all the users subscribing to that network may fetch documents. In some cases specialized servers called caching proxies, which can act as agents on the behalf of the client, are implemented in the network to locate a cached copy of a document. Typically, caching proxies serve as secondary or higher level caches, because they are concerned only with cache-misses from (primary) client caches. Client caches are typically part of the web browser, and may store either documents accessed during the current invocation (a nonpersistent cache such as is implemented by Mosaic), or documents accessed across invocations.

Generally speaking, a hierarchy of proxies can be formed by the client and server(s). For example, in a corporate network, there can be one or more of a project proxy, a departmental proxy, a divisional proxy and a site proxy, etc. An Internet service provider can implement proxies at one or more of each neighborhood, each sub-region, and each region, etc. The client and/or proxies form a caching hierarchy. In a strict hierarchy, when a cache miss occurs, the (client or) proxy requests the missed object from the immediately higher level of the hierarchy through a caching proxy interface, such as the HTTP interface as used in the CERN HTTP cache. More recently, in Harvest, "sibling" or "neighborhood" caches may be interrogated upon a cache-miss (see C. M. Bowman, et. al., "Harvest: A Scalable, Customizable Discovery and Access System," in Technical Report CU-CS-732-94, Department of Computer Science, University of Colorado, 1994). In either case, the caching decision is made at each local proxy independent of objects cached in other proxies. In other words, caching decisions are made solely as a function of the local cache contents and/or object characteristics.

Thus, there is a need for a push-based filtering method and system which exploits the proxy server hierarchy and which is based on actual usage behavior of the viewers. Furthermore, there is a need for a system and method whereby staging decisions can be made based on the push filtering decisions and the outcome of the push activities. There is also a need for a way to make the proxy hierarchy work more effectively by communicating or exchanging information among the proxy servers, the content servers and the clients. The present invention addresses the aforementioned needs.

SUMMARY

In accordance with the aforementioned needs, the present invention is directed to a method and system of filtering push information in a client-server hierarchy based on actual usage information. The usage information can include actual object reference/access patterns. A staging cache manager may be implemented at the server(s) to provide fast access when a filtered object is later requested.

A method having features of the present invention for dynamically filtering pushed objects in a proxy hierarchy wherein a pushed object is communicated down the hierarchy, includes the steps of: communicating up the hierarchy, usage information associated with the pushed object; and filtering the subsequently pushed object based on the communicated object usage information.

Another aspect of the present invention, includes the additional steps of: aggregating and exchanging information among nodes; and filtering the pushed object based on aggregated and exchanged information. This filtering step can also include the step of communicating meta-information associated with a filtered object.

Yet another aspect of the present invention, includes the further step of: adaptively staging objects based on one of: a filtering decision; a successful completion of the push to the selected lower level proxies/clients; the usage information; and a staging decision on other proxy nodes in the hierarchy. Other features enable the proxy server to manage the cache more effectively by timely purging staged objects and reducing redundant staging of objects.

According to still another aspect of the present invention, the pushed object includes a content hierarchy of meta-information, and wherein the filtering of the subsequently pushed object further includes the step of communicating the meta-information down the proxy hierarchy.

According to another aspect of the present invention, push filtering can include a decision on the content level to push. The filtering decision may be to push only the title or summary (instead of the full content) to some nodes in the next (lower) level hierarchy. Thus, the filtering decision can be not only on which next (lower) level nodes will receive the push, but also on the content level each node will receive. The filtering decision to a next (lower) level node can be based on the aggregate usage behavior of all users beneath that next (lower) level node.

According to still another aspect of the present invention, wherein a stream of pushed objects are communicated down the hierarchy, a method of dynamically filtering subsequently pushed objects, includes the steps of: annotating a push stream with meta information; and filtering one or more pushed objects, in response to the annotating step.

According to yet another aspect of the present invention, in an Internet environment, the PICS protocol may be used to communicate various types of information. First, PICS can be used by the content provider or higher level proxy nodes to annotate the object, i.e. to specify the characteristics of or information on the push object. This can include the urgency or priority of the push object, a summary or title of the object contents, a group classification, and/or a source channel (identity) of the push. Second, PICS can be used to convey usage or preference information of push objects upward from the lower levels of the hierarchy. This can include usage information and user preferences based on an object group classification. Third, PICS can be used to convey a staging status of each staged object (for some or all the upper hierarchy) down the hierarchy. Here, the PICS protocol may be generalized to exchange or communicate information throughout the hierarchy. Specifically, these various types of information can be stored at a header of the object using the PICS protocol. A new PICS label can be defined for each type of information such that the PICS category value corresponds to the specific situation. The lower level server (or client) can interpret the PICS category value to make better push or staging decisions.

BRIEF DESCRIPTION OF THE DRAWINGS

These and other improvements are set forth in the following detailed description. For a better understanding of the invention with advantages and features, refer to the description and to the drawings, wherein.

DETAILED DESCRIPTION

Figure 1:
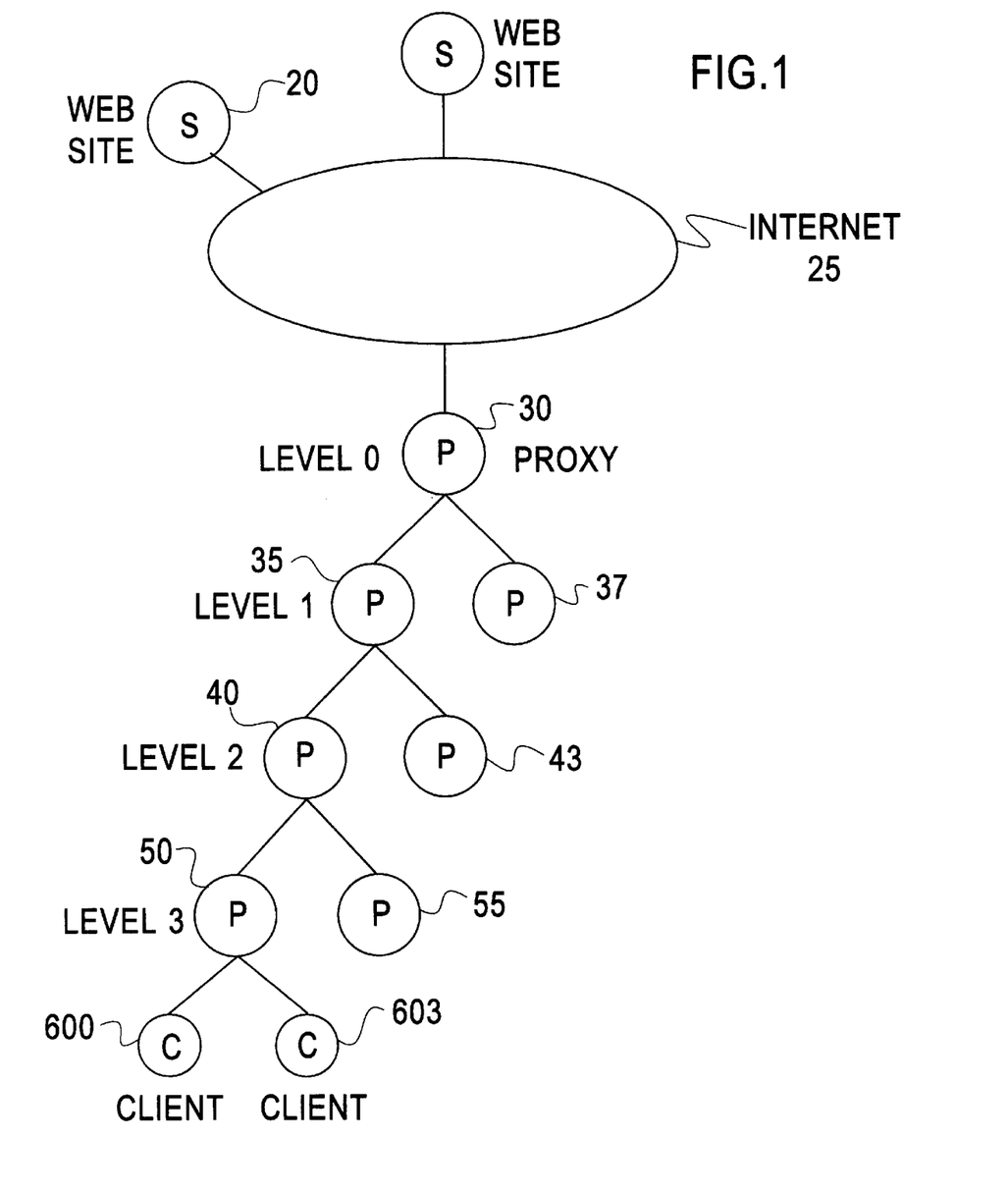
FIG. 1 is a diagram of a high-level architecture of a client-server hierarchy having features of the present invention.

FIG. 1 depicts an example of an overall architecture of a hierarchy of proxy servers having features of the present invention. As depicted, a client (600 . . . 603) may be connected through a hierarchy (level 0 . . . level 3) of proxy servers (30 . . . 55) to the Internet (25). By way of example only, the proxy hierarchy depicted includes 4 levels of proxy servers. One skilled in the art will appreciate that there can be any number of levels in the proxy hierarchy and the clients (600 . . . 603) can in fact be connected to any level thereof. The highest level (level 0) proxy (30) connects to the Internet. There are two level 1 proxies (35 and 37) with one of the level one proxies (35) connected to two level 2 proxies (40 and 43). Client 603 is coupled to its immediately higher level (level 3) proxy (50) and then to its level 2, 1, and 0 proxies (40, 35 and 30), respectively. The client can access various web sites (20) through the Internet (25). The client may have its own client proxy to manage staging and user information. Those skilled in the art will also realize that a hierarchy of proxy servers could comprise a client (600) and a single proxy server.

From the viewpoint of client (603), certain proxies (55, 43 and 37) are not part of its proxy hierarchy. Those skilled in the art will appreciate that although a typical communication path is via the immediately higher level proxy, a lower level proxy may communicate directly to other higher level proxies or the Internet.

In a conventional proxy hierarchy, upon receiving a pushed object, the object is pushed down to the next (lower) level proxies. On the other hand, for a "pull" request on an object not available locally, a request for the missed object is made to the next higher level proxy. If the higher level proxy has previously staged the object, it will pass down the object. Otherwise, it will try to obtain the object from its next higher level proxy. Once the object is obtained, it is passed down to the next lower level proxy requesting the object.

Note that FIG. 1 only conveys a logical connection diagram to represent the information flow of objects and requests. It does not represent a physical connection diagram. The logical connection can change due to workload, and physical events such as a node or link failure. Different types of objects may also follow different logical paths of transmission to reach the users.

By way of overview, the server (30 . . . 50) of the present invention passes information on the push object and its staging decision along with the object to the next (lower) level proxy. In fact, not only its own staging decision, but also the staging decision(s) of the entire upper hierarchy can be passed down.

The present invention also has features for efficiently communicating information up or down the hierarchy. In an http implementation, the information exchange can be included in an object header using existing web protocols. PICS ("Platform for Internet Content Selection") specifies a method of sending meta-information concerning electronic content. PICS is a Web Consortium Protocol Recommendation (see http://www.w3.org/PICS). PICS was first used for sending values-based rating labels, such as "How much nudity is associated with this content," but the format and meaning of the meta-information is fully general. In PICS, meta-information about electronic content is grouped according to the "rating service" or producer-and-intended-usage of the information, and within one such group, any number of categories or dimensions of information may be transmitted. Each category has a range of permitted values, and for a specific piece of content, a particular category may have a single value or multiple values. In addition, the meta-information group (known as a "PICS label") may contain expiration information. There are also facilities for permitting a PICS label to apply to more than one piece of electronic content Each PICS label for a specific piece of electronic content may be added or removed from the content independently.

For example, an image file may be sent from a server with a single PICS label whose "rating service" field indicates it contains values-based rating labels according to the "Safe-Surf" rating system. According to the present invention, as it passes through an enterprise proxy, the image file may also receive a second PICS label whose "rating service" field indicates it contains proxy staging information. As it passes through a departmental proxy, the second PICS label may be stripped. Thus, the client computer may only sees the first PICS label. The http protocol has been augmented with request headers and response headers that support PICS. The technical bodies which define other common application protocols, such as NNTP, are now also considering adding PICS support. As part of these protocols, a list of the types of PICS labels desired may be included with a request. PICS also specifies a query format for receiving PICS information from a central label bureau server. A sample PICS label is: (PICS-1.1 "http://the.rating.service" label for "http://the.content" exp "1997.07.01T08:15-0500" r (n 4 s 3 v 2 1 0)) where the 'n' 's' 'v' '1' are transmit names for various meta-information types, and the applicable values for this content are 4 (for n), 3 (for s), 2 (for v) and 0 (for 1). Only software which recognizes the ID "http://the.rating.service" would know how to interpret these categories and values.

In a preferred embodiment, three different kinds of PICS labels are used. The first kind of PICS label, referred to as a "push" label or (P-label), is used by the content provider or higher level proxy to annotate the object, i.e. to specify the characteristics of or information on the push object. It can include, but is not limited to, any combinations of the following categories:

Urgency category: the value of an "urgency" category conveys how urgent it is to push the object downward. We denote "UV" as its category value.

Summary category: the value of a "summary" category conveys a short summary of the push object/document. In a more general case, an object may be specified in multiple levels of details. This content hierarchy can consist of more than the two levels (full content and summary) given above. For example, it can include another title level. For a news object, it can include: a title such as "Bomb Explosion" which is a summary of "Terrorists planted a bomb at a shopping center and caused 2 deaths;" and the full content of the news. Additional content levels such as the title can also be provided by the P-label using a separate category for each additional content level, e.g. a "title" category for the object title. Furthermore, the summary category can also be given a different urgency category value from the whole object (i.e. the complete content). For example, a higher urgency category value can be given to the summary.

Group category: the value of a "group" category conveys a group classification of the object. For example for company news broadcasting, typical group category values may include "corporate," "HR," "division," "competitors," etc. The primary objective of introducing the group category is to allow the collection of user information (as discussed in the next paragraph) by group category and make a push decision by the group category.

Channel category: the value of a "channel" category conveys the broadcast channel, or the content source. For example, it can be an internal corporate channel, or an external channel such as is available from Pointcast, Inc., under the trademark POINTCAST (http://www.pointcast.com). Different channels can have different group categories.

In the preferred embodiment, one group category and one channel category are discussed to simplify the presentation. Those of skill in the art will appreciate that a generalization to multiple groups and/or channel categories is straightforward—all statistics will be maintained on a group basis for each channel separately and the push filtering decision made based on the usage behavior to an object group.

A second kind of PICS label, referred to as a "user" label (U-label), can be used to convey usage or preference information of push objects from a lower level of the hierarchy upward. It can include, but is not limited to, any combinations of the following categories:

Usage category: the value of the "usage" category conveys how frequently objects (in an object group) are actually referenced/accessed in the lower hierarchy. This category value is denoted by "RV."

Preference category: the value of the "preference" category conveys what users indicate of their interests through profile specifications. Profile information can become obsolete if the users do not update them as their interests change. This category value is denoted by "PV."

A third type of PICS label, referred to as the "staging" label (C-label), is used by proxies to communicate and share operational information (such as caching/staging information) as the object passes through the hierarchy. It can include, but is not limited to, the following category:

Status category: the value of the "status" category indicates if and/or how the object is staged in the upper hierarchy. It can specify at each higher level hierarchy whether the object is staged. If a content hierarchy is available, the category value can further indicate whether the full document or the summary is staged.

The staging status value of an object is denoted by "CV." A method of determining a CV value at a given proxy will now be described. For example, a binary value representation may be used to determine the CV value as follows: For an n-th level proxy, the CV value of an object passed down to it includes n bits and the k-th bit has a value of one if the (n-k) level proxy has staged the object when it passed the object down the hierarchy. Otherwise, the k-th bit is set to a value of zero. Furthermore, the staging status information can also be used to direct the object request to the closest higher level proxy which has potentially staged the object, instead of requesting it from the next immediate higher level proxy.

Referring again to FIG. 1, consider for example a CV value of an object A. Assume that a level 0 proxy (30) and a level 2 proxy (40) have staged object A and that a level 1 proxy (35) has not staged object A. The CV value of the object A passed down to the level 3 proxy 50 will thus be "101" (in binary) or 5 (in decimal). Object A's CV value passed down to proxies 35 and 40 is respectively "1" and "10". Those skilled in the art will appreciate that there are alternative methods of representing the staging status in the hierarchy. A simpler, but less accurate, method is to use a single bit to represent whether any higher level proxy has staged the object. If the bit is on, then a higher level proxy has staged the object. Otherwise, no higher level proxy has staged the object.

Figure 2:
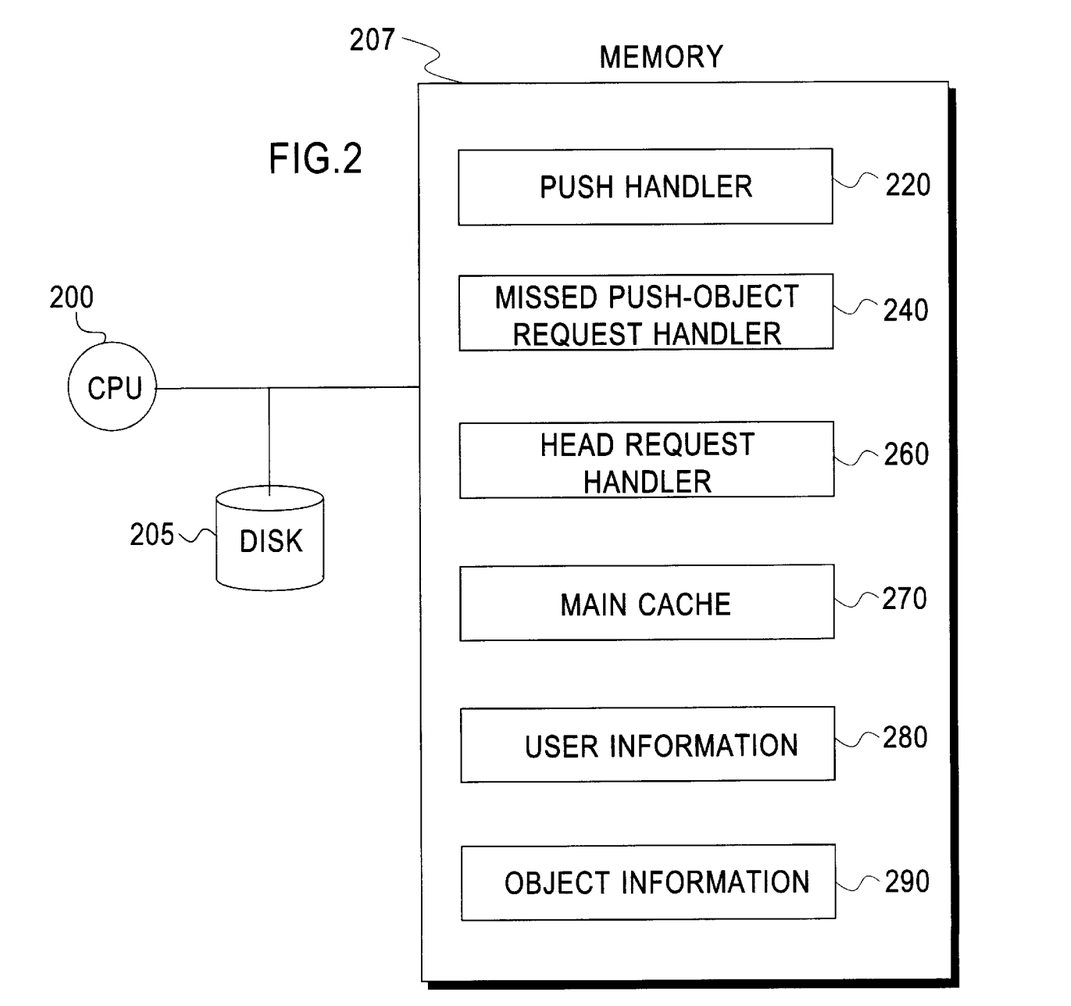
FIG. 2 depicts an example of the server of FIG. 1.

FIG. 2 depicts a more detailed example of an architecture of the proxy server of FIG. 1. As is conventional, the proxy server includes a CPU (200), a disk (205) such as a magnetic, electronic, or optical storage media for persistent data and/or program/code storage, and a memory (207) for dynamic access and/or execution of the data and/or programs by the CPU (200). Those skilled in the art will appreciate that within the spirit and scope of the present invention, one or more of the components instantiated in the memory (207) could be accessed and maintained directly via disk (205), the network (25), another server, or could be distributed across a plurality of servers. Three important components of the proxy server, preferably embodied as software executable on CPU (200), are a push handler (220), a missed push-object request handler (240), and a head request handler (260) which will be described in more detail with reference to FIGS. 5, 10 and 4, respectively.

The memory (207) contains several other structures which are also relevant to features of the present invention. As will be discussed in more detail with reference to FIG. 8, a cache (270) can be maintained at each proxy node. It can be used to stage a push object when the push has been filtered. This will speedup the access time if the object is later requested. It is important to note that the cache can be extended into lower levels of a storage hierarchy such as the disk (205). Hence, a cached or staged object in the proxy may reside at any level of the storage hierarchy. As will be discussed in more detail with reference to FIG. 4, aggregate user information for each of the next level nodes will be maintained, as indicated by the user information 280, to assist with the filtering decision. As will be discussed in more detail with reference to FIG. 8, certain object information 290 (such as UV) associated with each staged object is maintained for the filtering decision. This will factor into a subsequent decision on purging a staged object from the cache, as will be described with reference to FIG. 10.

Figure 3:
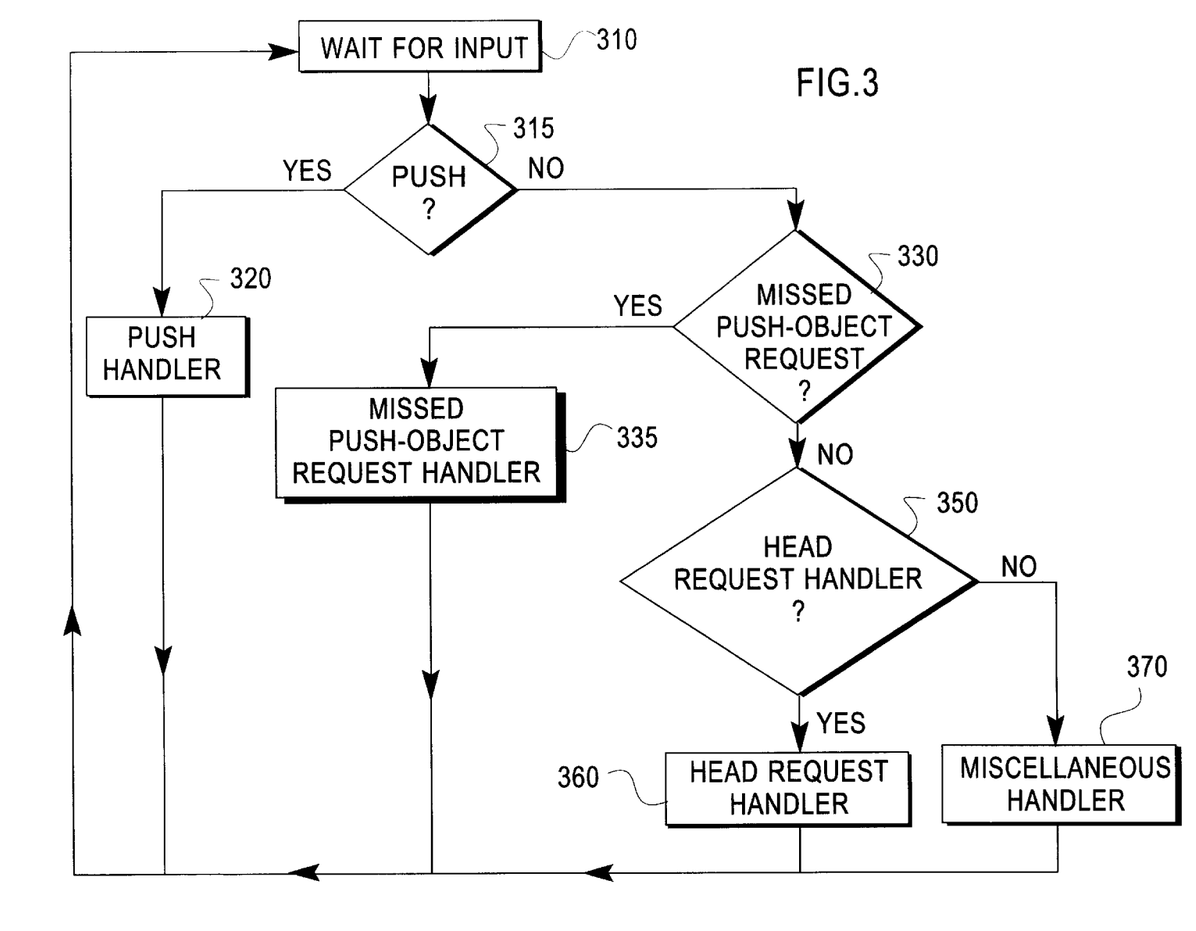
FIG. 3 depicts an example of the server logic.

FIG. 3 depicts an example of proxy server logic having features of the present invention. As depicted, in step 310, the proxy server waits for input. In step 315, depending upon the input received, different actions will be taken. If the input received is a push (from the next higher level), in step 320, the push handler 320 is invoked. A detailed example of the push handler will be described with reference to FIG. 5. In step 330, if the input received is a missed push-object request, the missed push-object request handler 240 is invoked, in step 335. The missed push-object request handler 240 handles a request from a lower level proxy (or client) for an object filtered by a higher level proxy node. A detailed example of the missed push-object handler will be described with reference to FIG. 10. In step 350, if the input received is a head request (from the lower level proxy or client), in step 360, the head request handler 260 will be invoked. The head request handler 260 handles HTTP head requests to convey user information from the lower level proxies. A detailed example of the head request handler will be described with reference to FIG. 4. In step 350, for other types of inputs, which are not the focus of the present invention (such as the conventional HTTP "pull" request, or an FTP request) an appropriate miscellaneous handler (370) can be invoked.

Figure 4:
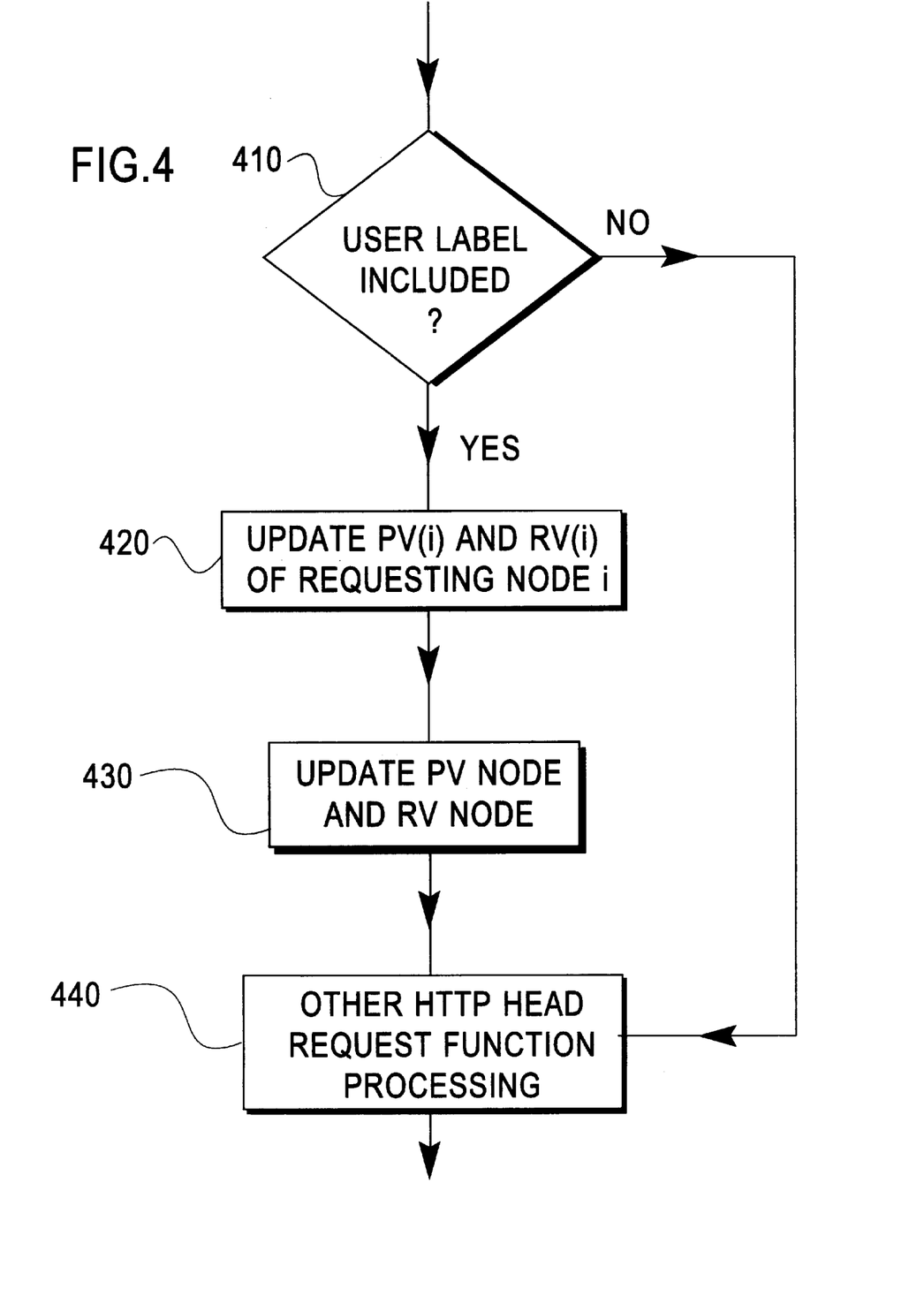
FIG. 4 depicts an example of the head request handler.

FIG. 4 depicts an example of the head request handler (260). As depicted, in step 410 the proxy checks if the head request received from the next lower level node i contains a user label (U-label) in the header. The U-label contains two categories: usage; and preference, where the associated category values are denoted by RV and PV, respectively. For each of the next lower level nodes i, the proxy server maintains in memory its usage and preference category values in RV(i) and PV(i), respectively in user information (280). In step 420, RV(i) and PV(i) are updated to the newly received values for node i. In step 430, the proxy node also maintains aggregate usage and preference values (denoted as RVnode and PVnode, respectively) across all next lower level nodes. An exponential averaging method is preferably used to update these two values. Specifically, PVnode is set to its current value plus a fraction of the difference between the new and old PV(i) values. An example is to select the fraction to be 0.5. The RVnode value is similarly set. In step 440, other information in the HTTP header can be processed. An example is checking the "freshness" of an object based on the last time it was modified.

Figure 5:
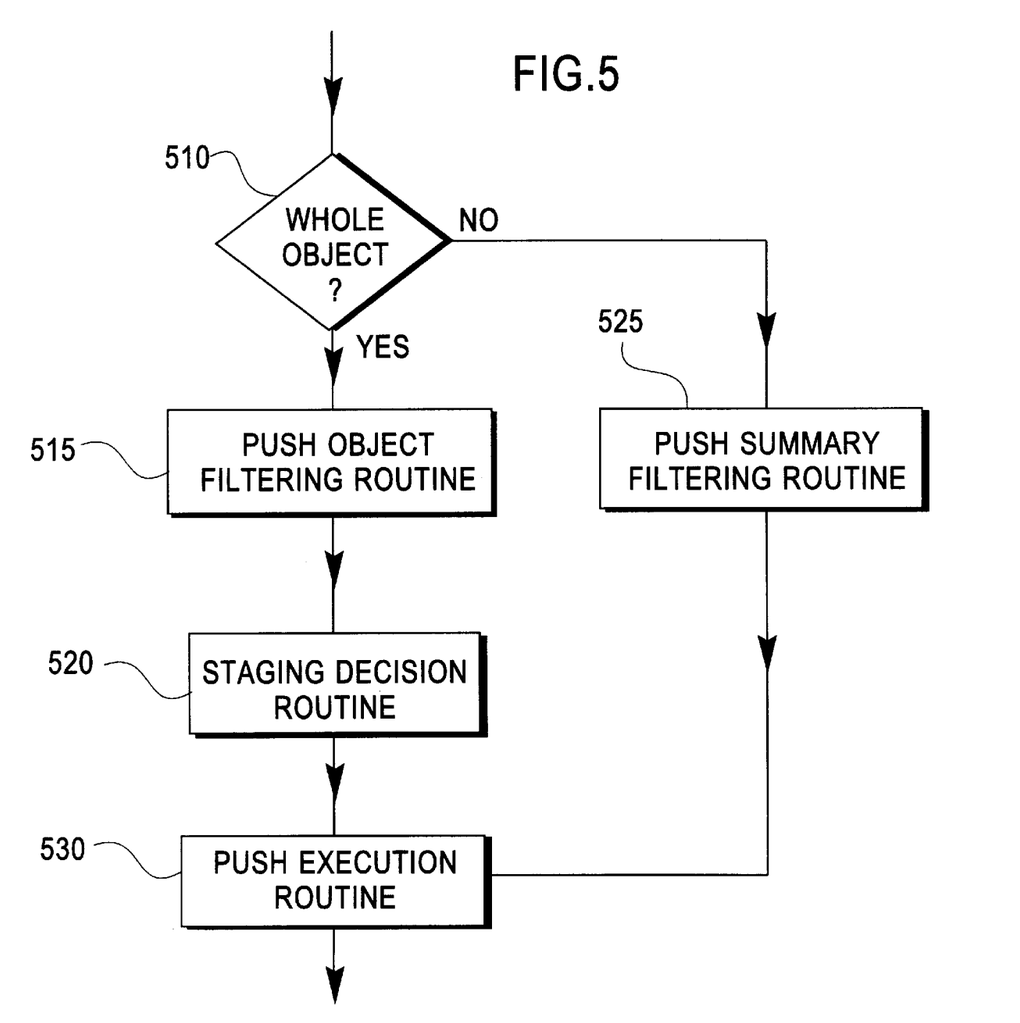
FIG. 5 depicts an example of the push handler.

FIG. 5 depicts an example of the push handler 220. As depicted, in step 510, if the object pushed down from the next (higher) level is a whole object, i.e., the full content, not just a header, the push object filtering routine is invoked, in step 515 to make a filtering decision on the push to the next lower level node(s). A detailed example of the push object filtering routine will be described with reference to FIG. 6. In step 520, the staging decision routine is invoked to determine whether to stage an object at this node. A detailed example of the staging decision routine will be described with reference to FIG. 8. In step 510, if only a summary information is pushed down from the higher level proxy, the push summary filtering routine is invoked to determine whether to push the summary to a lower level node, in step 525. A detailed example of the push summary filtering routine will be described with reference to FIG. 7. In step 530, the push execution routine is invoked to carry out the push to the lower level nodes. A detailed example of the push execution routine is described with reference to FIG. 11.

Figure 6:
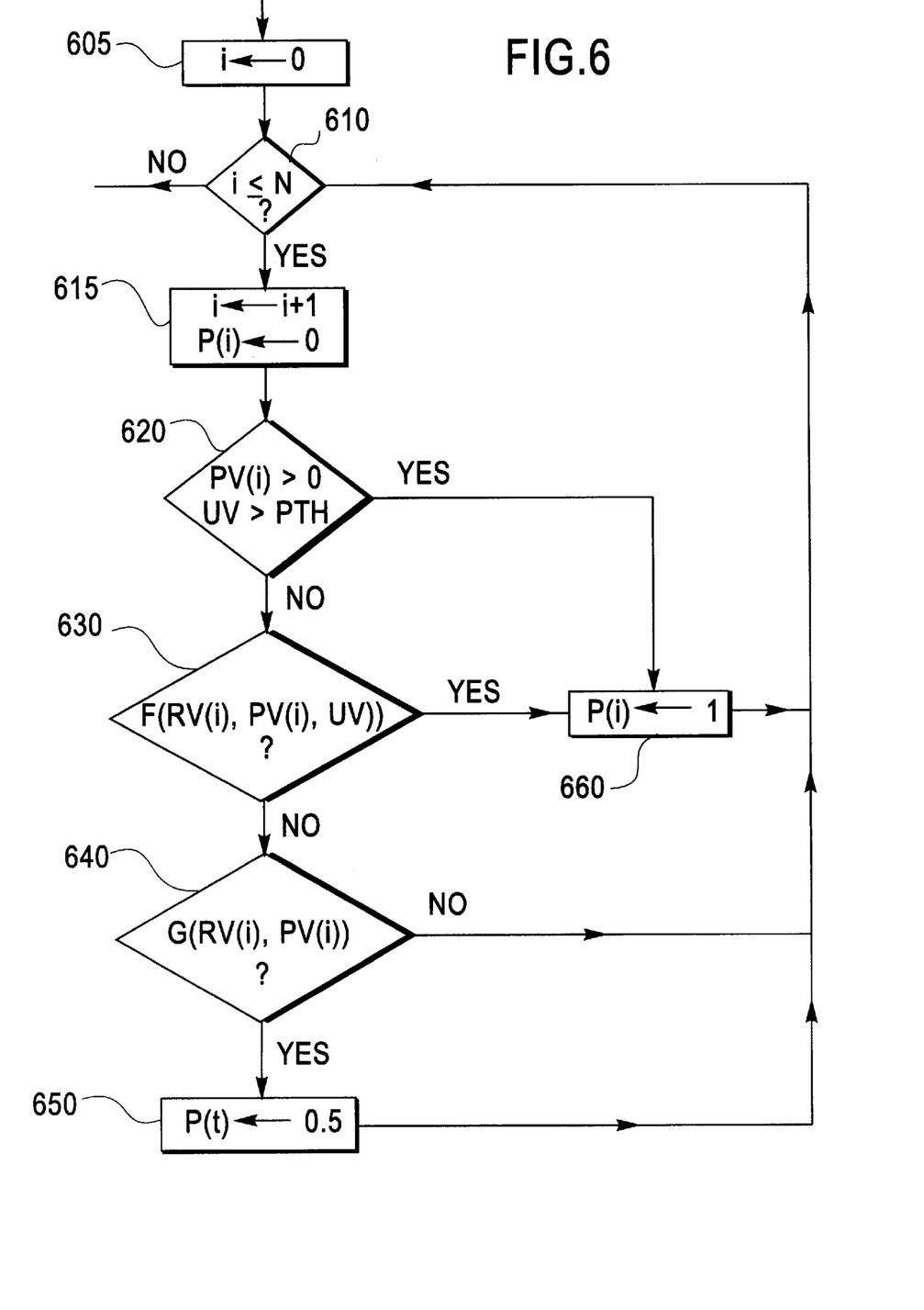
FIG. 6 depicts an example of the push object filtering routine.

FIG. 6 depicts an example of the push object filtering routine. In step 610, an index variable i is initialized to 0. In step 610, if the index variable i is less than N, the number of nodes in the next lower level, in step 615, the value of i is incremented, e.g., by 1 and the push decision variable P(i) is initialized, e.g., to 0. In step 620, if the urgency level of the push (UV) of the object is higher than the urgent push threshold (PTH), and as long as PV(i) is larger than 0 (indicating that some lower level users have specified an interest in the object, e.g., via their profiles), then in step 660, a push decision will be chosen (P(i) is set to 1) such that the whole object will be pushed down to node i (see step 1120 in FIG. 11). Otherwise, in step 630, a (logical) function F(RV(i), PV(i), UV), i.e., a function of the object's property (e.g., UV) and user characteristics (e.g. RV(i) and PV(i)), can be invoked to determine the filtering decision. If F(RV(i), PV(i), UV) is true, step 660 is performed to set P(i) to 1, indicating that the whole object will be pushed down to node i. A simple example of F(RV(i), PV(i), UV) is the logical expression ((RV(i)UV>QTH) and (PV(i)>0)), where QTH is some threshold such as 1. A more elaborate F function can also be designed to factor in the object bandwidth and/or size. For example, an alternative F(RV(i), PV(i), UV) can be the logical expression ((RV(i)UV>WTH) and (PV(i)>0)), where WTh is a threshold that increases with the object's size and decreases with the available bandwidth. WTH can also take into consideration the expiration time of the document. Its value can be set lower for an object with a longer time to expiration. In step 640, a (logical) function G(RV(i), PV(i)) is invoked to make a push summary decision. An example of G(RV(i), PV(i)) can be a logical expression ((RV(i)>0) and (PV(i)>0)). Again, similar to the F function, a more elaborate G function can be designed to take other factors, such as bandwidth, into consideration in making the push summary decision. In step 650, P(i) is set to 0.5 to indicate that the summary will be pushed down to node i.

Figure 7:
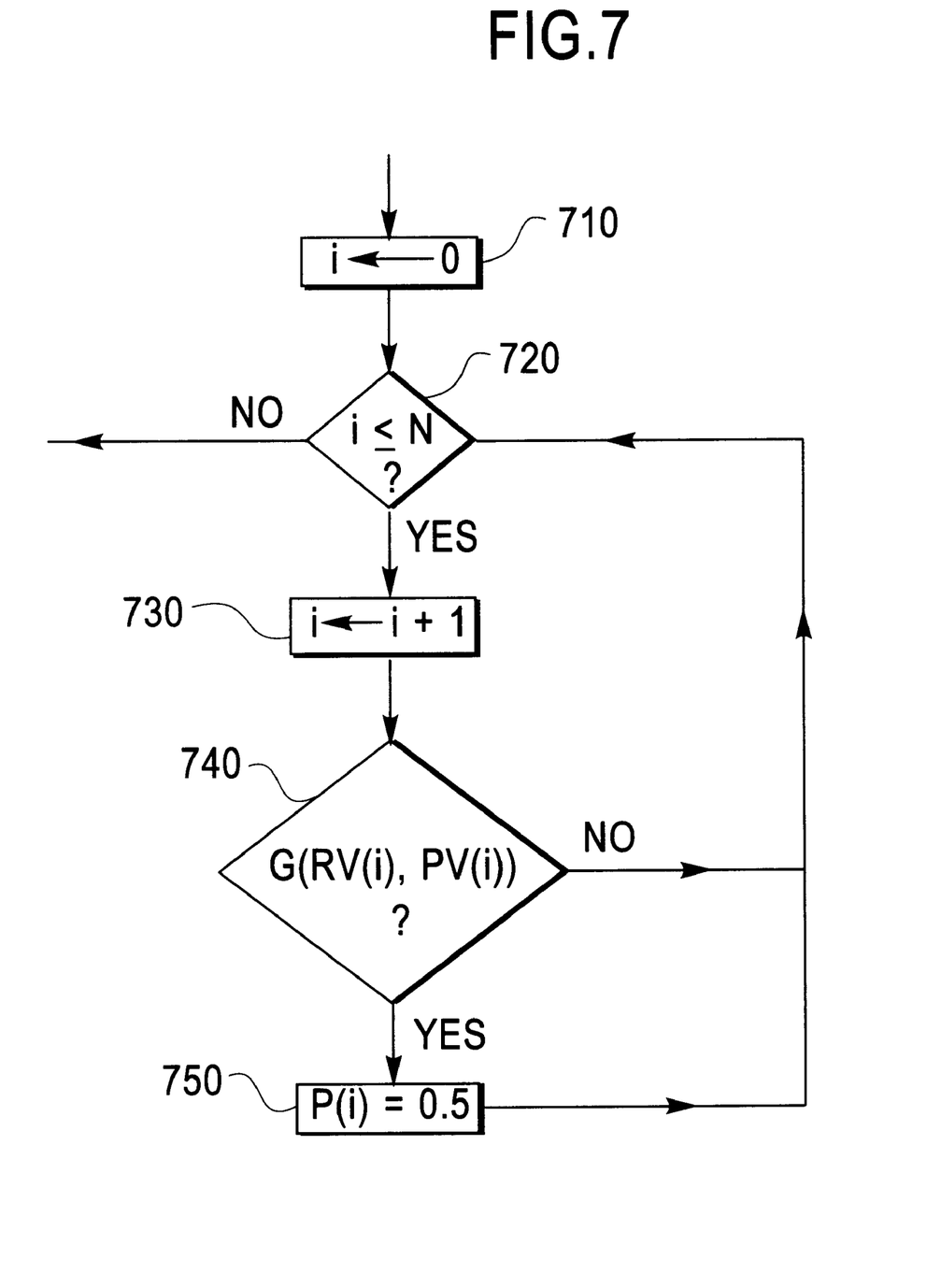
FIG. 7 depicts an example of the push summary filtering routine.

FIG. 7 depicts an example of the push summary filtering routine. In step 710, an index variable i is initialized to 0. In step 720, if the index variable i is less than N, the number of nodes in the next lower level, in step 730, the value of i is incremented, e.g., by 1. In step 740, a function G(RV(i), PV(i)) is invoked to make the push summary decision. (This is the same function invoked in step 640.) In step 740, if the G function is true, in step 750, P(i) is set to 0.5 to indicate that the summary will be pushed down to node i (see step 1140 in FIG. 11).

Figure 8:
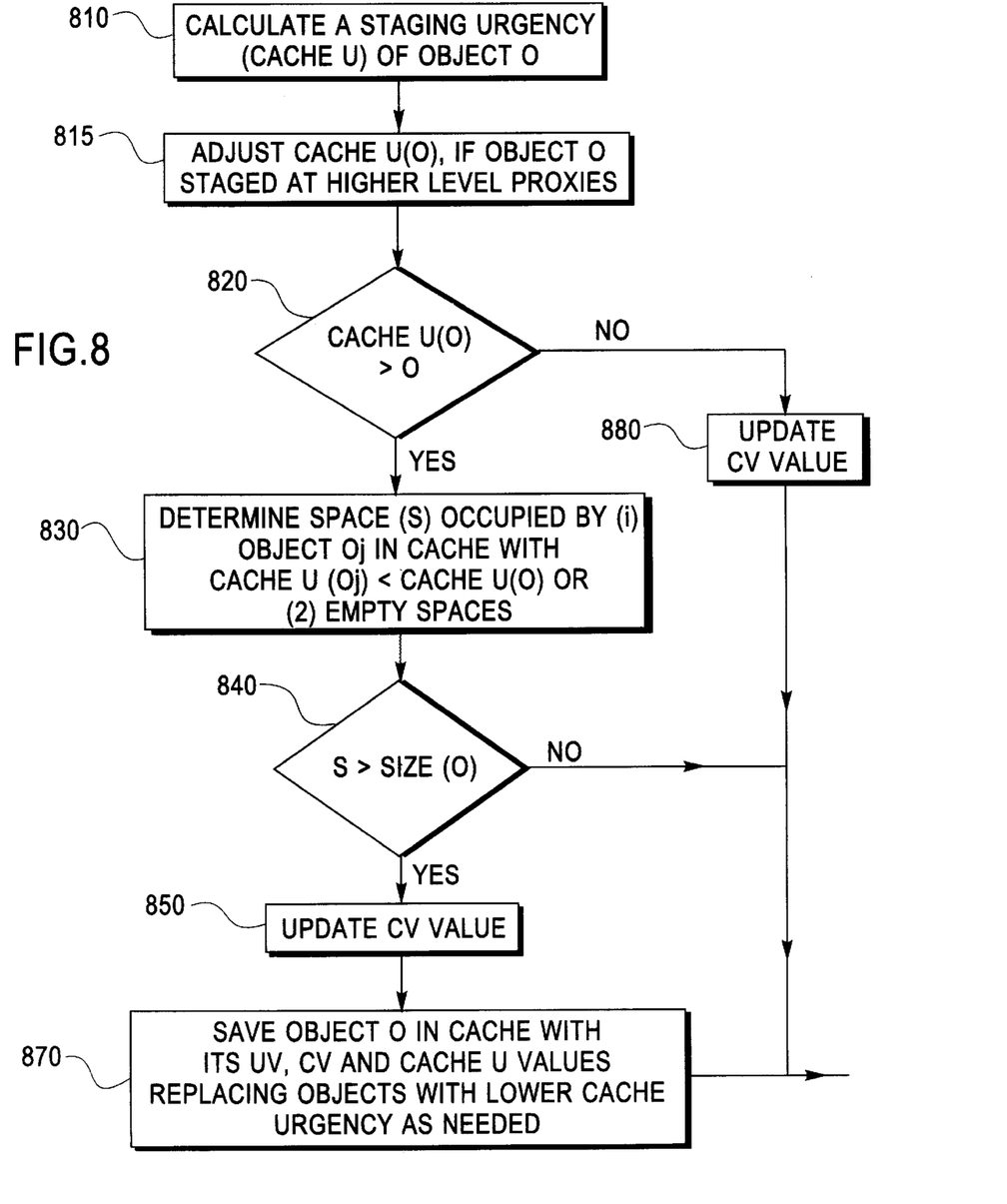
FIG. 8 depicts an example of the staging decision routine.

FIG. 8 depicts an example of the staging decision routine. In step 810, the "staging urgency" factor of an object O is calculated. This factor is denoted as CacheU(O). An example of logic for the calculation of the staging urgency of an object will be discussed with reference to FIG. 9. In step 815, the CacheU(O) value can be adjusted downward based on the staging status of object O at the higher level proxies. The staging status information is given in the staging label (C-label) in the HTTP header. If object O is already staged in some higher level proxy cache, the need to stage it at the current node is reduced. In step 820, if CacheU(O) is larger than 0, in step 830, the amount of space (S) which is either: (1) occupied by all objects Oj with a lower staging urgency than object O; or (2) available, i.e. not currently used, is determined. If in step 840, S is larger than size(O), the size of object O, in step 850, the CV value of the object O is updated to reflect that it is staged in the current node. Specifically, the original CV value can be multiplied by 2, and then incremented by 1 to get a new CV value. In step 870, the object O is saved in the cache (270) and the object's associated CV, UV and CacheU values are stored in the object information (290) portion of memory. Object O replaces other objects with lower staging urgency values as needed. If in step 820 the CacheU(O) value is zero, the object will not be staged and the CV value will be updated to reflect that it is not staged at this proxy. Specifically, the original CV value can be multiplied by 2 to get the new CV value. Furthermore the C-label of the object will take the new CV value generated in either step 850 or step 880 to reflect the staging status when the object is pushed down the hierarchy (see step 1100 in FIG. 11).

Those skilled in the art will appreciate that a variety of cache inclusion processes are possible within the spirit and scope of the present invention. For example, object in a new category could be staged on a space available basis, even if never previously requested.

Figure 9:
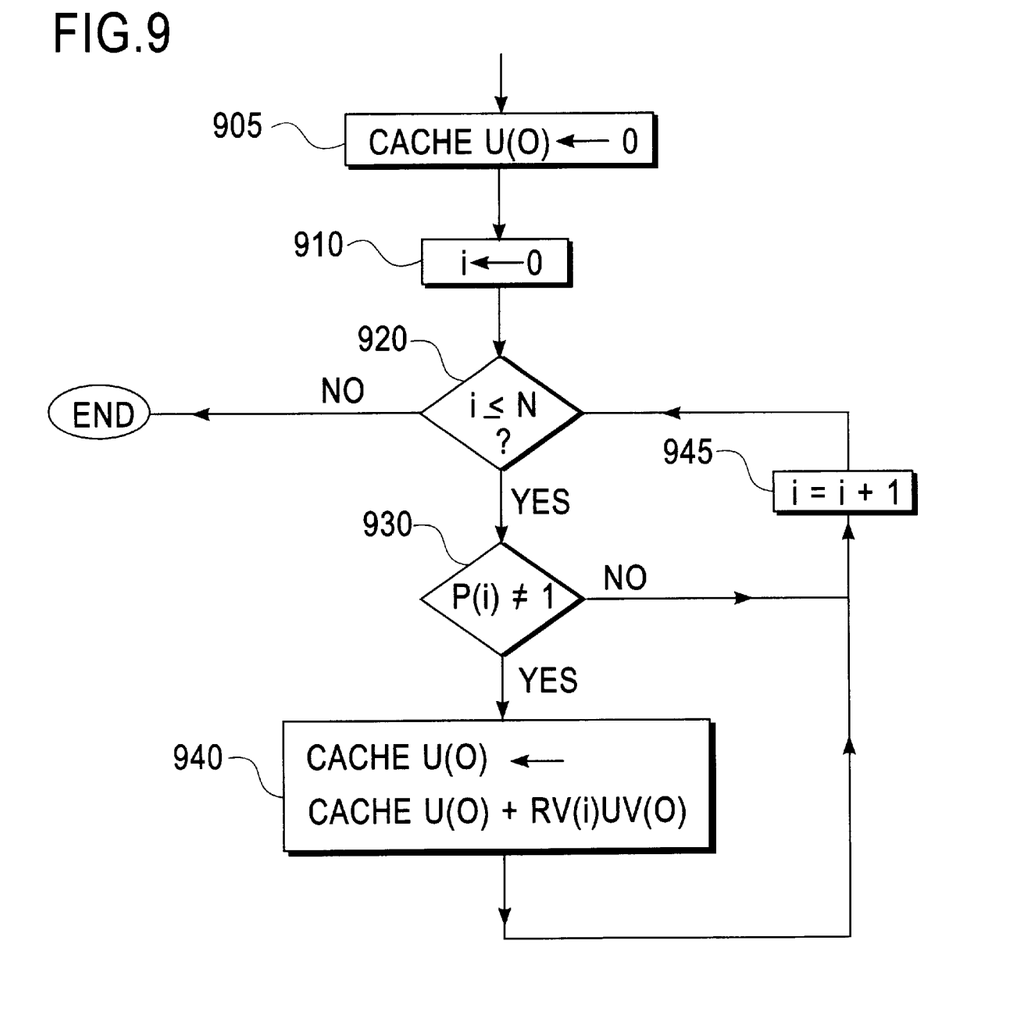
FIG. 9 depicts an example of calculation of staging urgency.

FIG. 9 depicts an example of logic for the calculation of the staging urgency of an object O. In step 905, the staging urgency value, CacheU(O), is initialized, e.g., to 0. In step 910, an index variable i is initialized to 0. In step 920, if the index variable i is less than N, the number of nodes in the next lower level, and in step 930, the push decision variable P(i) is not equal to 1, then in step 940, CacheU(O) is incremented by the value of RV(i)UV(O). In step 945, i is incremented and the process returns to step 920. If in step 920, i>N, then the process ends.

Figure 10:
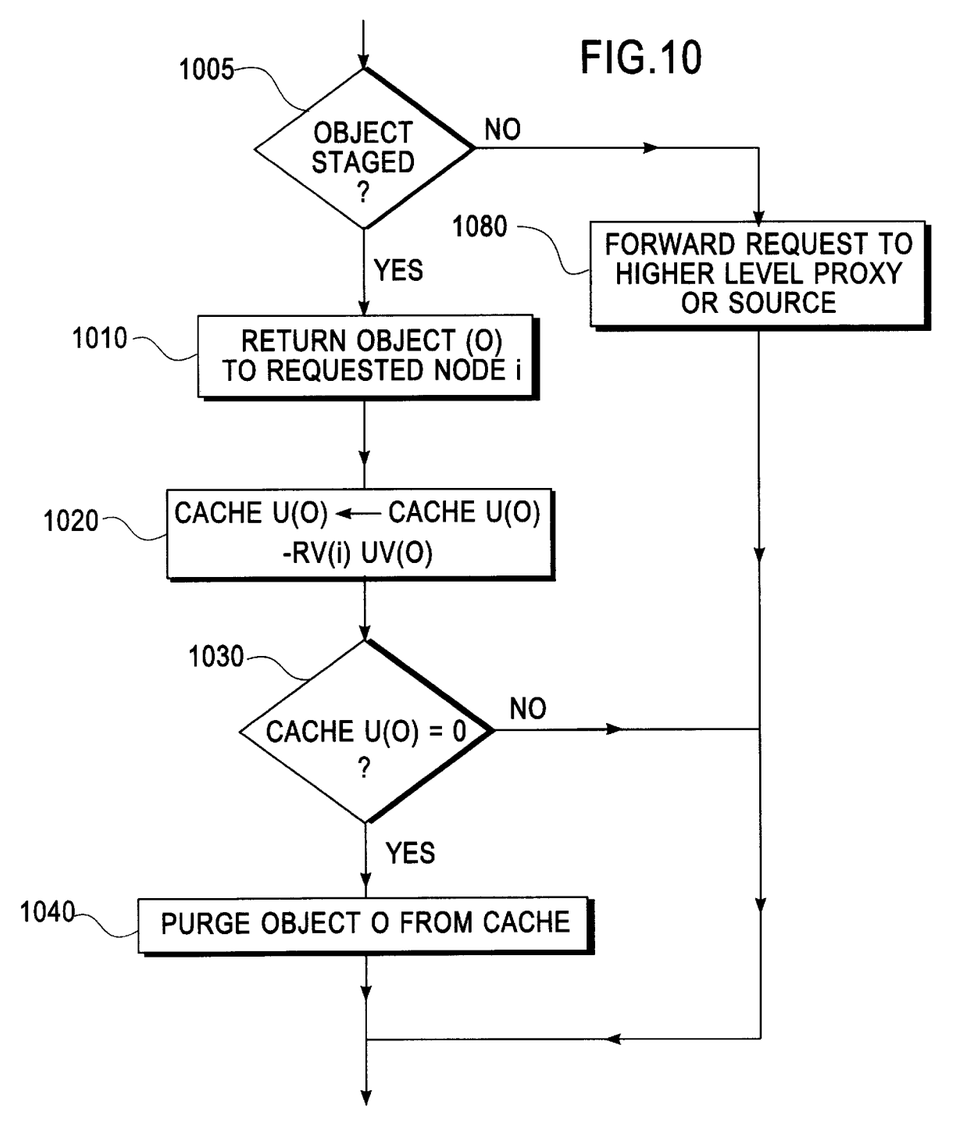
FIG. 10 depicts an example of a missed push object request handler.

FIG. 10 depicts an example of the missed push object request handler (240). When a push object O is filtered and requested subsequently from a lower level node, in step 1005, a check is made to determine if the object O is staged in the current node. If so, in step 1010, the object is returned to the requested node with its CV value inserted in its C-label. In step 1020, the staging urgency value of the object O is recalculated. In step 1030, if this value has dropped to zero (which means that all next lower level nodes with an interest on the object have received a copy of that object) or some other predetermined or calculated value, in step 1040 the object O will no longer be staged. In step 1005, if the object is not staged, in step 1080, the request is forwarded to a higher level proxy server or the content source.

Figure 11:
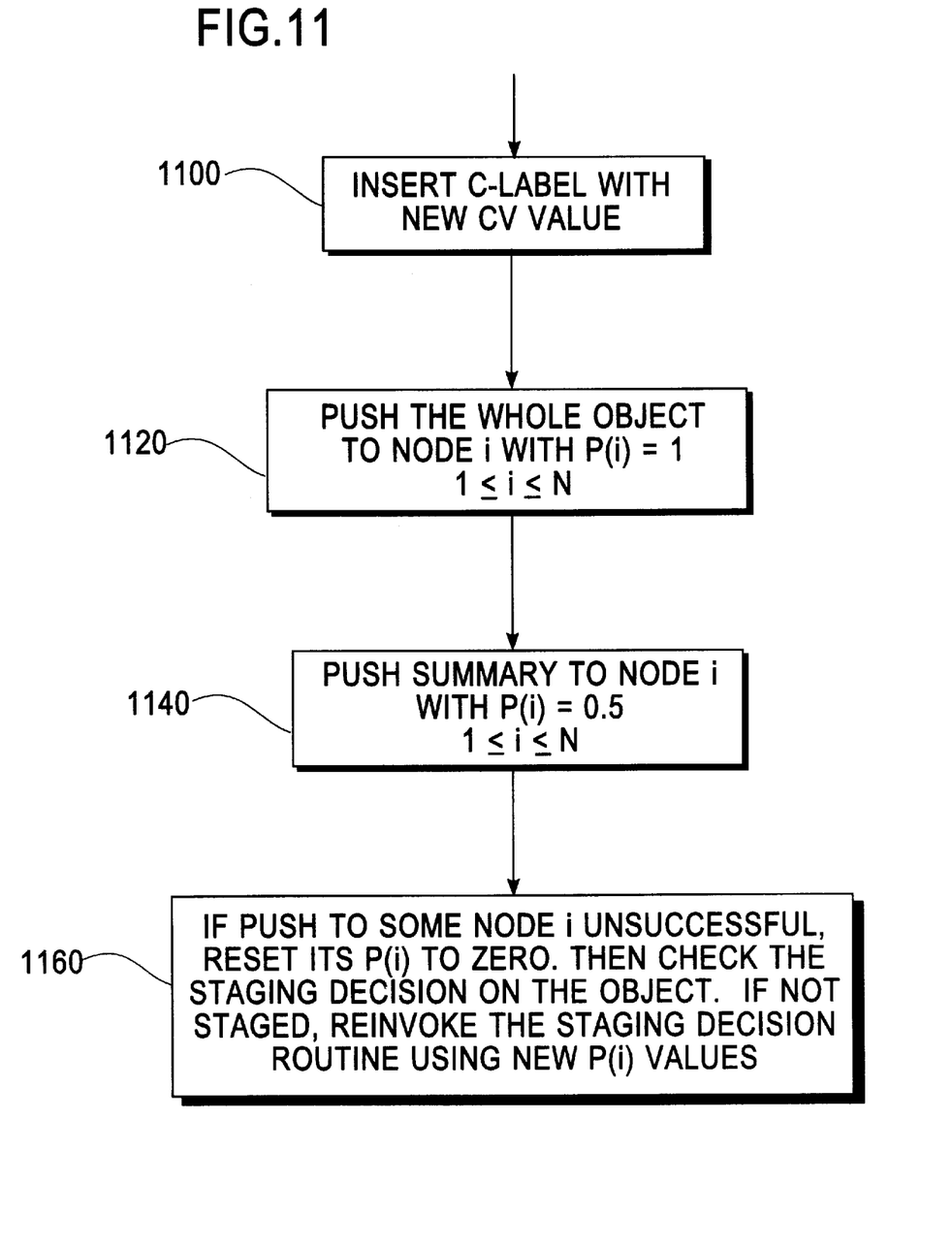
FIG. 11 depicts an example of a push execution routine.

FIG. 11 depicts an example of the push execution routine (FIG. 5, step 530). In step 1100, the CV value (from step 850 or 880 in FIG. 8) of the object is inserted into its C-label in the HTTP header. In step 1120, the whole object O will be pushed to all next lower level nodes with P(i) equal to 1. In step 1140, a summary header of the object O will be pushed to all next lower level nodes with P(i) equal to 0.5. In step 1160, if the push is unsuccessful (e.g., due to a link or node failure or mobile clients being inaccessible) to some node i, the P(i) value will be reset to zero. Furthermore, the output of the staging decision routine (step 520 of FIG. 5) for object O is checked. If the staging decision output was to not stage the object, the staging decision routine (FIG. 8) will be re-invoked with the new set of P(i) values to determine if the object should now be staged due to the failure of some of the pushes.

Those skilled in the art will appreciate that the dynamic push filtering scheme also works in a heterogeneous proxy server environment, where some of the proxies are conventional proxies which do not understand the filtering protocol and do not participate in the collaboration.

In the preferred embodiment of the present invention, a general push filtering policy for web servers has been described. Those skilled in the art will appreciate, however, that the present invention is applicable to any kind of situation where the objects to be pushed have similar characteristics, and is not necessarily restricted to an Internet or WWW application.

Those skilled in the art will further appreciate that although the preferred embodiment of the present invention is for collaborative push filtering with staging between parent and child nodes in the hierarchy, it can be easily adapted to include collaboration between sibling nodes. For example if no proxy in the upper hierarchy has staged the requested object, a proxy can also interrogate sibling proxies. Additionally, the staging decision routine of FIG. 8 can be easily adapted to factor in staging decisions of proxy nodes outside of the hierarchy, including but not limited to a sibling node, into its staging decision.

Thus, while we have described our preferred embodiments of our invention, with alternatives, it will be understood that those skilled in the art, both now and in the future, may make various improvements and enhancements which fall within the scope of the claims which follow. These claims should be construed to maintain the proper protection for the invention first disclosed.

We claim:

1. In a proxy hierarchy wherein a pushed object is communicated down the hierarchy, a method of dynamically filtering subsequently pushed objects, comprising the steps of:
   communicating up the hierarchy, usage information associated with the pushed object; and
   filtering a subsequently pushed object based on communicated object usage information.

2. In a proxy hierarchy wherein a pushed object is communicated down the hierarchy, a method of dynamically filtering pushed objects, comprising the steps of:
   aggregating and exchanging usage information among nodes of the proxy hierarchy; and
   filtering the pushed object based on aggregated and exchanged usage information.

3. The method of claim 2, wherein said filtering step further comprises the step of communicating meta-information associated with a filtered object.

4. The method of claim 1, further comprising the step of:
   adaptively staging objects based on one or more of: a successful completion of a push to one or more selected lower level proxies/clients; and a staging decision on other proxy nodes in the proxy hierarchy.

5. The method of claim 1, wherein the pushed object includes a content hierarchy of meta-information, and wherein said filtering the subsequently pushed object further comprises the step of communicating the meta-information down the proxy hierarchy.

6. The method of claim 5, wherein said step of communicating the meta-information further comprises the steps of:
   communicating a short description of the object down the hierarchy, and
   staging a filtered object in the proxy hierarchy.

7. The method of claim 4, wherein said step of staging objects further comprises the step of:
   purging a staged object after one of: all immediate lower level proxies or client nodes with potential interests as indicated in a user profile have received the object; and a staging urgency factor has dropped below one of a predetermined and calculated threshold.

8. The method of claim 1, said filtering step further comprising the step of estimating an aggregate usage and preference for the pushed object by all lower level client nodes in the hierarchy.

9. The method of claim 4, wherein the objects are classified into object groups, and usage information for each object group is based on previous user request patterns.

10. The method of claim 1, wherein the usage information includes request patterns of a lower level proxy or client, further comprising the steps of:
    classifying said pushed objects into different groups;
    aggregating and exchanging among nodes the usage information including pushed object groupings; and
    filtering the pushed object based on aggregated and exchanged information and the pushed object groupings.

11. The method of claim 4, wherein the filtering decison or the staging decision is a function of one of a bandwidth, object property, or client characteristics.

12. The method of claim 11, wherein the client characteristics includes a user profile or preference information.

13. The method of claim 1, further comprising the steps of:
    associating and communicating down the hierarchy an object urgency indicator with the pushed object; and
    said filtering step is a function of the object urgency indicator.

14. The method of claim 4, further comprising the steps of:
    associating an urgency indicator with one or more different levels of the hierarchy; and
    said staging step includes the step of staging the objects on the one or more levels of the content hierarchy as a function of the urgency indicator.

15. The method of claim 4, wherein one of said filtering step and staging step is a function of the object size.

16. The method of claim 4, wherein one of said filtering step and said staging step is a function of a life span of the object or an expiration time.

17. The method of claim 4, further comprising the step of communicating a staging status of the pushed object with the pushed object, in response to said staging step.

18. The method of claim 4, wherein the proxy hierarchy includes a heterogeneous proxy hierarchy wherein one of said filtering step and said staging step is not performed by all servers in the hierarchy.

19. The method of claim 2, further comprising the steps of:

creating a PICS usage label and using a PICS category value to represent aggregate usage information at a lower level of the proxy hierarchy; and said communicating step including the step of communicating the aggregate usage information up the hierarchy using the PICS usage label.

20. The method of claim 4, further comprising the steps of:

creating a PICS staging label and using a PICS category value to represent a staging status of a staged object at a given level of the proxy hierarchy; and communicating the staging status down the hierarchy using the PICS staging label.

21. The method of claim 4, further comprising the steps of:

creating a PICS push label and using a PICS category value to represent an urgency indicator for the pushed object; and communicating the urgency indicator down the hierarchy using the PICS push label.

22. The method of any one of claims 1–3, 5, 6, 9–10, 14–15, 19–20 or 21, further comprising using a meta-information protocol to communicate information through the hierarchy.

23. The method of any one of claims 1–3, 5, 6, 9–10, 14–15, 19–20, or 21, further comprising using a PICS protocol to communicate information through the hierarchy.

24. The method of claim 4, further comprising the steps of:

creating a PICS push label and using a PICS category value to represent a summary of the pushed object; and communicating the summary down the hierarchy using the PICS push label.

25. The method of claim 1, further comprising the step of adaptively staging objects based on a staging decision on proxy nodes outside of the hierarchy.

26. In a proxy hierarchy wherein a stream of pushed objects are communicated down the hierarchy, a method of dynamically filtering subsequently pushed objects, comprising the steps of:

annotating a push stream with usage meta information; and filtering one or more pushed objects, in response to said annotating step.

27. The method of claim 6, wherein one of a filtering decision and a staging decision varies for different levels of the content hierarchy.

28. A program storage device readable by a machine, tangibly embodying software executable by the machine to perform method steps in a proxy hierarchy wherein a pushed object is communicated down the hierarchy for dynamically filtering subsequently pushed objects, said method steps comprising:

communicating up the hierarchy, usage information associated with the pushed object; and filtering a subsequently pushed object based on communicated object usage information.

29. A program storage device readable by a machine, tangibly embodying software executable by the machine to perform method steps in a proxy hierarchy wherein a pushed object is communicated down the hierarchy for dynamically filtering subsequently pushed objects, said method steps comprising:

aggregating and exchanging usage information among nodes of the proxy hierarchy; and filtering the pushed object based on aggregated and exchanged usage information.

30. A program storage device readable by a machine, tangibly embodying software executable by the machine to perform method steps in a proxy hierarchy wherein a pushed object is communicated down the hierarchy for dynamically filtering subsequently pushed objects, said method steps comprising:

annotating a push stream with usage meta information; and filtering one or more pushed objects, in response to said annotating step.

* * * * *